No. 673,008. Patented Apr. 30, 1901.
F. L. McGAHAN.
FURNACE.
(Application filed Jan. 8, 1900.)
(No Model.) 5 Sheets—Sheet 1.

WITNESSES:
INVENTOR
ATTORNEYS

No. 673,008.　　　　　　　　　　　　　Patented Apr. 30, 1901.
F. L. McGAHAN.
FURNACE.
(Application filed Jan. 8, 1900.)

(No Model.)　　　　　　　　　　　　　　　　　5 Sheets—Sheet 2.

WITNESSES:　　　　　　　　　　　　　　INVENTOR
　　　　　　　　　　　　　　　　　　　Fred. L. McGahan
　　　　　　　　　　　　　　　　　　BY
　　　　　　　　　　　　　　　　　　　Fowler & Fowler
　　　　　　　　　　　　　　　　　　　　ATTORNEYS No. 673,008. Patented Apr. 30, 1901.
F. L. McGAHAN.
FURNACE.
(Application filed Jan. 8, 1900.)
(No Model.) 5 Sheets—Sheet 3.
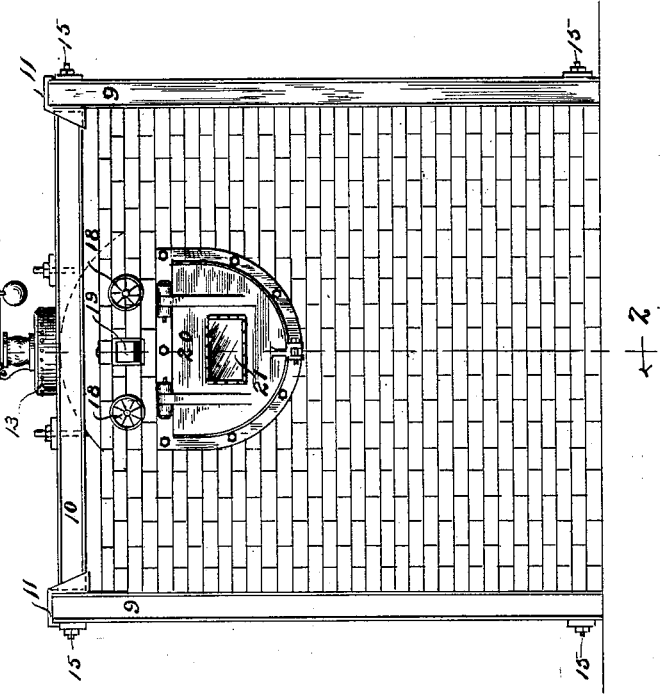
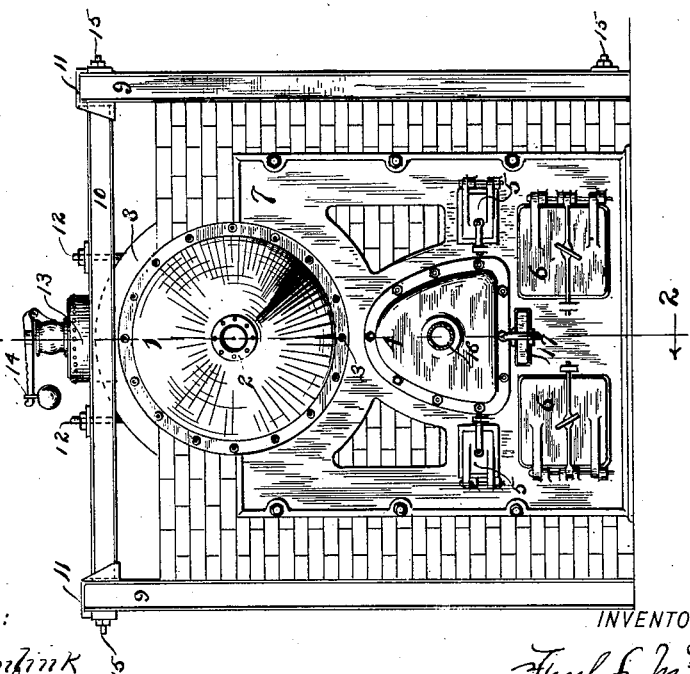
WITNESSES:
L. Clinton Hamlink
G. K. Hamlink
INVENTOR
Fred. L. McGahan
BY
ATTORNEYS No. 673,008. Patented Apr. 30, 1901.
F. L. McGAHAN.
FURNACE.
(Application filed Jan. 8, 1900.)
(No Model.) 5 Sheets—Sheet 4.
Fig. 5
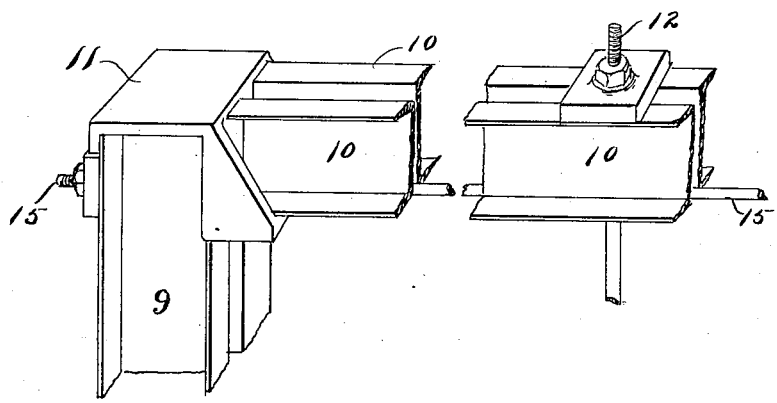
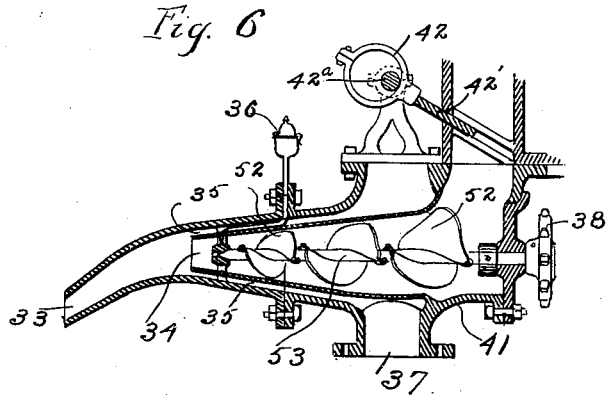
Fig. 6
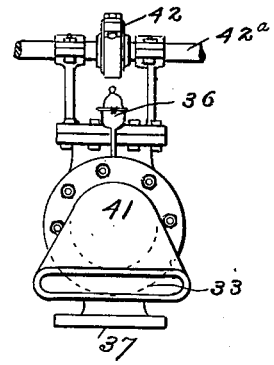
Fig. 7
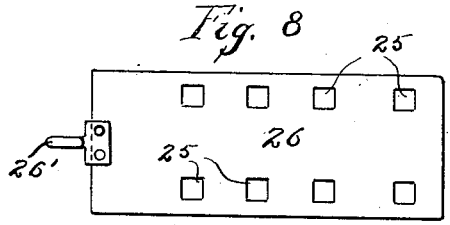
Fig. 8
Fig. 13
WITNESSES:
INVENTOR
Fred L. McGahan
BY
ATTORNEYS No. 673,008. Patented Apr. 30, 1901.
F. L. McGAHAN.
FURNACE.
(Application filed Jan. 8, 1900.)
(No Model.) 5 Sheets—Sheet 5.
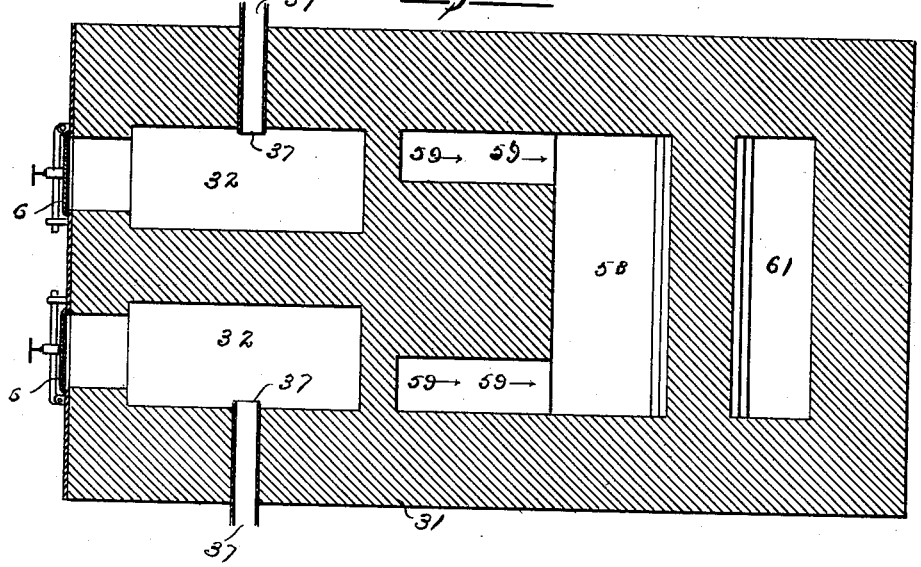
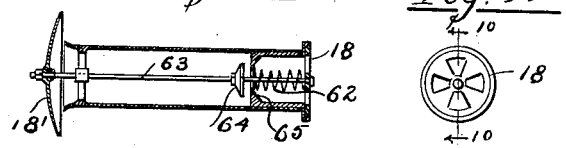
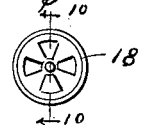
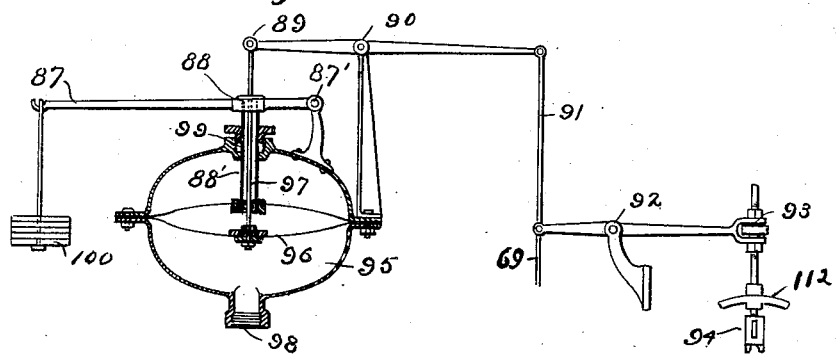
WITNESSES:
INVENTOR
ATTORNEYS

UNITED STATES PATENT OFFICE.

FREDERICK L. McGAHAN, OF ST. LOUIS, MISSOURI.

FURNACE.

SPECIFICATION forming part of Letters Patent No. 673,008, dated April 30, 1901.

Application filed January 8, 1900. Serial No. 714. (No model.)

*To all whom it may concern:*

Be it known that I, FREDERICK L. MCGAHAN, a citizen of the United States, residing at the city of St. Louis, in the State of Missouri, have invented a certain new and useful Furnace, of which the following is such a full, clear, and exact description as will enable any one skilled in the art to which it appertains to make and use the same, reference being had to the accompanying drawings, forming part of this specification.

My invention relates to improvements in the class of furnace shown in Patent No. 515,528, granted to me February 27, 1894. In this class of furnace the smoke and unconsumed gases from the furnace are drawn off by a suction-fan and after being passed through the generator, where they are mixed with hydrogen and oxygen formed by decomposing water, they are returned to the furnace.

One object of my invention is to so construct a furnace of this class as to make the combustion more perfect.

Another object of my invention is to provide improved means for feeding the fuel to the furnace; and still another object of my invention is to provide means for automatically increasing the action of the fan and fuel-feeding mechanism when the pressure in the boiler is reduced.

My invention consists in various novel features and details of construction, all of which are described in the following specification and pointed out in the claims affixed hereto.

Figure 1:
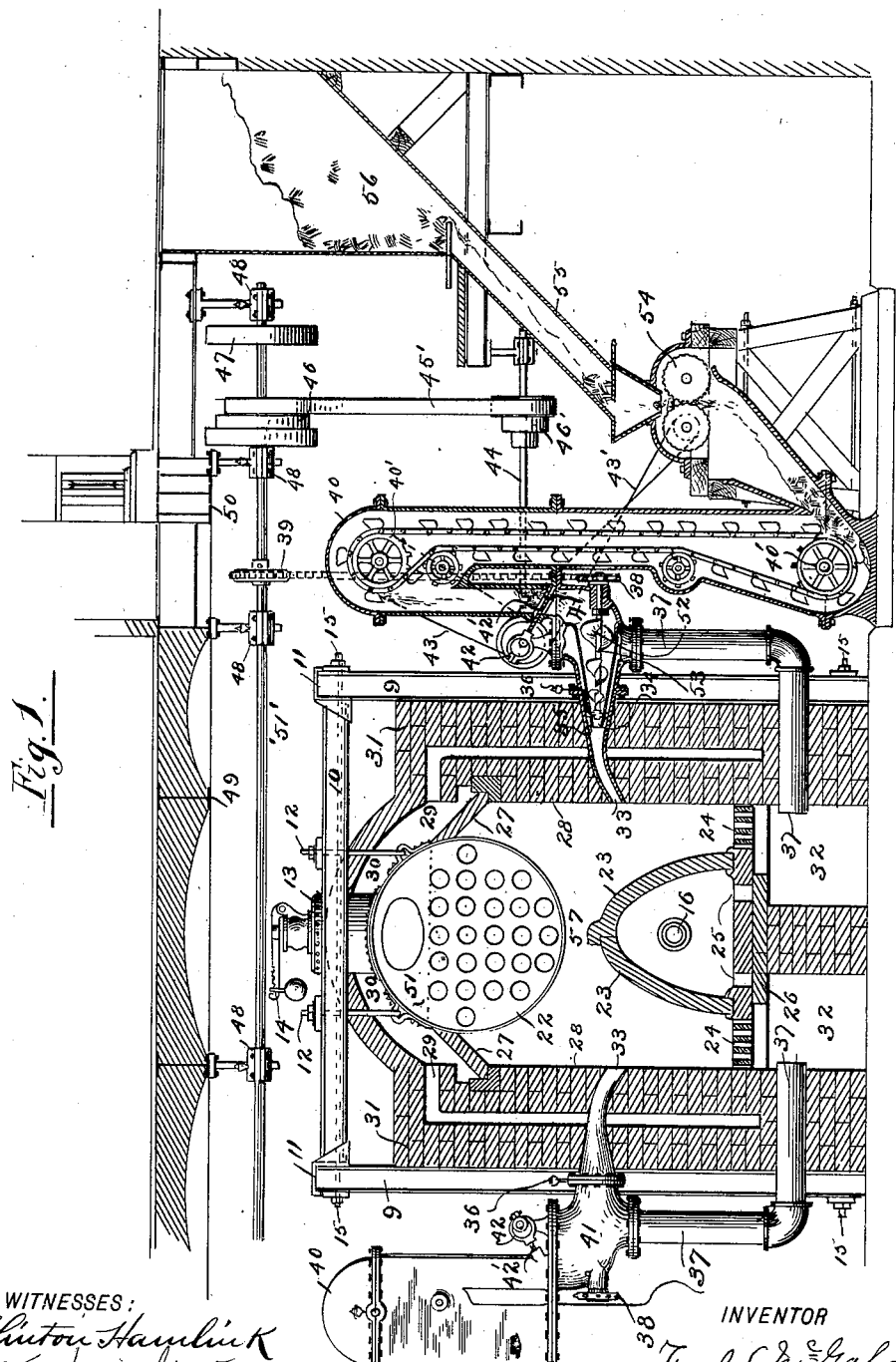
Figure 2:
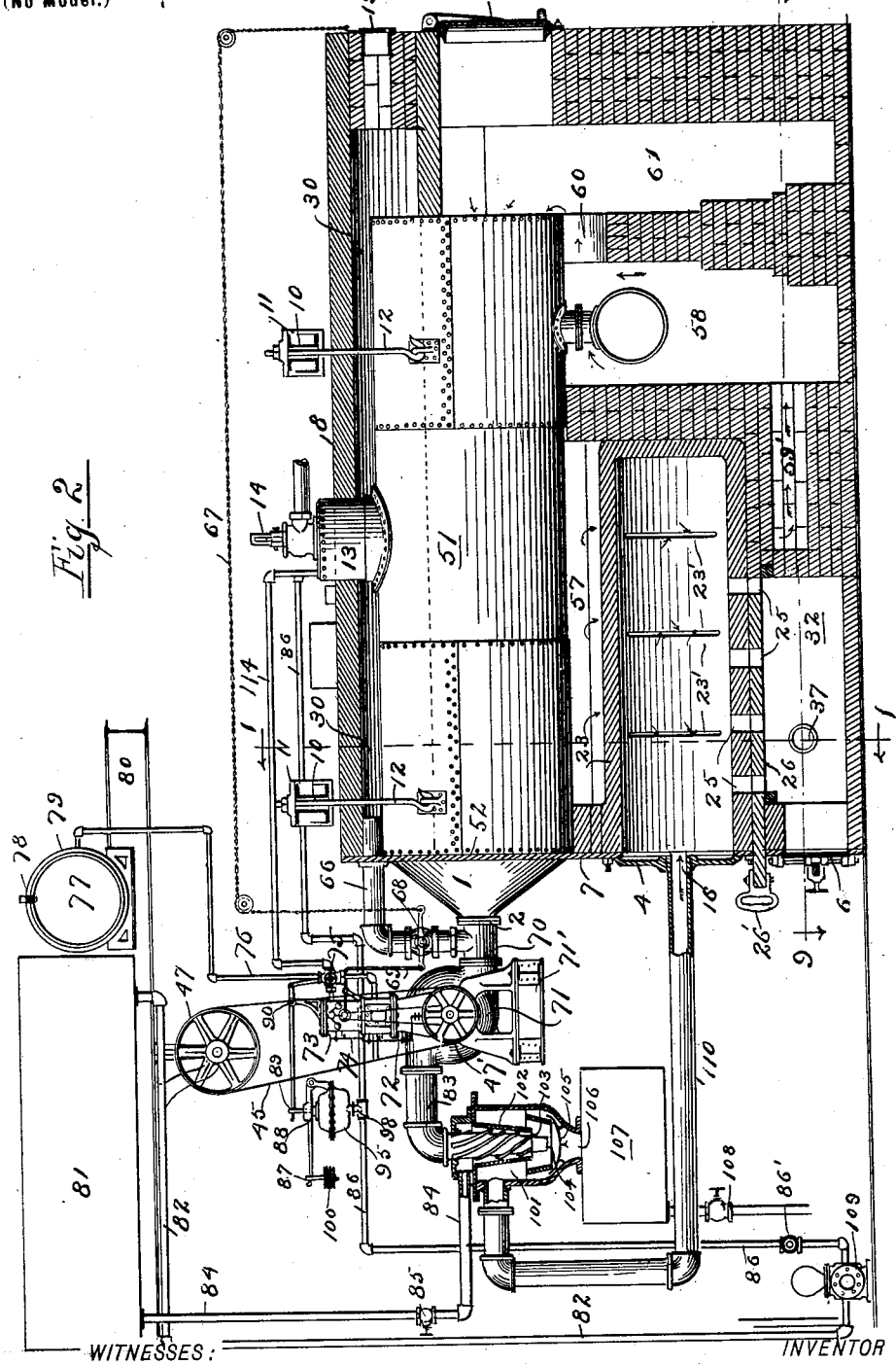

In the accompanying drawings, where one form of furnace made in accordance with my invention is shown, Figure 1 is a section on the line 1 1 of Fig. 2. Fig. 2 is a view, partly in elevation and partly in section, on the line 2 2 of Figs. 3 and 4. Fig. 3 is a front end view. Fig. 4 is a rear end view; Fig. 5, an isometric projection showing a detail of construction. Fig. 6 is a section of the fuel-feeding mechanism. Fig. 7 is an end view of the same. Fig. 8 is a view of a detail. Fig. 9 is a horizontal section on the line 9 9 of Fig. 2. Fig. 10 is a section of one of the automatic inlet-valves, taken on the line 10 10 of Fig. 11. Fig. 11 is an end view of the same. Fig. 12 is a view, partly in elevation and partly in section, showing the automatic regulator; and Fig. 13 is a side view of the part shown in Fig. 8.

Like marks of reference refer to similar parts in the several views of the drawings.

51 is the boiler, the front end 52 of which is covered by a conical cap 1. The conical cap 1 is provided with a central aperture 2 and is secured to the front plate 7 of the furnace by means of bolts 3. 4 is a cap, also secured to the plate 7, which closes the front end of a gas-receiver 23, hereinafter to be described.

5 represents doors for giving admission to the combustion-chamber, and 6 represents the doors of the ash-pits 32.

Above the boiler 51 is an arch 8, of the usual construction, supported by walls 31. The boiler 51 is suspended, by means of bolts 12, from cross-bars 10. The cross-bars 10 are supported by uprights 9, to which they are secured by means of saddles 11 and bolts 15. The steam-dome 13 of the boiler 51 projects through the arch 8 and is provided with a safety-valve 14, of the usual construction.

16 is a central opening in the front cap 4, which closes the front end of the gas-receiver 23.

In the rear end of the furnace are two automatic inlet-valves 18. (Shown in detail in Figs. 10 and 11.) Each of the valves 18 is provided with a movable part 64, carried on a stem 63 and adapted to come against a seat 65. The part 64 is held normally against the seat 65 by means of a spring 62. The inner end of the stem 63 is provided with a disk 18'.

19 is a valve which is adapted to be operated by an automatic regulator in a manner hereinafter to be described.

20 is the rear door, which is preferably provided with a mica panel 21.

The gas-receiver 23 is preferably formed of fire-clay and asbestos or mineral wool and is preferably formed in two parts, as shown in Fig. 1. Formed in the sides of the gas-receiver 23 are slots 23', communicating with the combustion-chamber 57. At each side of the gas-receiver 23 is a grate 24. Formed in the bottom of the gas-receiver 23 are passages 25, which are adapted to be opened or closed by means of a valve 26, provided with a handle 26'.

30 is a dead-air space, which is separated from the combustion-chamber by means of slabs 27 of refractory material. The dead-air space 30 is provided with downwardly-extending air-passages 29. The combustion-chamber 57 communicates, by means of a passage 59, with a space 58, surrounding the mud-drum. The space 58 communicates through an opening 60 with a space 61 at the rear of the boiler.

71 is a suction-fan supported on a suitable frame 71'. The fan 71 is connected with the opening 2 in the conical cap 1 by means of a pipe 70. The fan 71 is driven by a motor 72. The motor 72 is a combined gas and steam engine, having a gas-cylinder 73 and a steam-cylinder 74.

75 is a gas-generator for generating the gas for the cylinder 73. Gasolene is supplied to the generator 75 by a pipe 76, leading to a tank 77, held in a suitable frame 79, supported on cross-beams 80. The steam-cylinder 74 is supplied with steam by a pipe 114, leading from the steam-dome 13 of the boiler 51.

Extending from the fan 71 is a pipe 83, which leads to a heat-retainer and gas-generator 101. This heat-retainer and gas-generator is in all respects like one described in my previous patent above referred to, except that it is not provided with screens. It consists of a water-spreader 103, surrounded by a conical part 102. The end 104 of the pipe 83 terminates adjacent to a basin 105, which is adapted to contain the condensed smoke and other heavy impurities. The generator 101 communicates by means of an opening 106 with a tank 107. The tank 107 is provided with a pipe 108, by means of which its contents may be drawn off. The upper part of the heat-retainer and gas-generator 101 is connected by means of a pipe 84 with a water-tank 81. In the pipe 84 is a suitable valve 85. The tank 81 is supplied with water through a pipe 82 by means of a pump 109. Steam is furnished to the pump 109 through a pipe 86, which communicates with the steam-dome 13 of the boiler 51. In the pipe 86 is a suitable valve 86'. Leading from the heat-retainer and gas-generator 101 to the opening 16 in the cap 4 is a pipe 110. Leading from the pipe 70 to the dead-air space 30 is a pipe 66, containing a valve 68. The valve 68 is automatically operated by mechanism which will now be described.

95 is a regulator which is connected with the steam-pipe 86 above described. The regulator 95 contains a diaphragm 96, upon which rests the end of a rod 97, passing through a tube 88', which is secured at 88 to a lever 87, pivoted at 87' to the regulator 95. On the lever 87 hang weights 100, which determine the amount of pressure necessary to keep the diaphragm 96 in its upper position. The upper end of the rod 97 is pivoted to one end of a lever 90, to the opposite end of which is pivoted a rod 91. The rod 91 is attached to one end of a lever 92, the opposite end of which is attached to the stem 93 of the governor controlling the engine 72. 94 is the governor-valve, and 112 a portion of the governor-frame. The depending end 69 of the rod 91 is secured to the valve 68 hereinbefore described, and operates it at the same time that the governor of the engine 72 is actuated. Secured to the valve 68 is a chain 67, which runs over suitable pulleys actuating the valve 19 in the rear end of the furnace and communicating with the dead-air space 30.

On the shaft of the engine 72 is a pulley 47', and a similar pulley 47 is secured to a main driving-shaft 51'. The shaft 51' is supported by means of brackets 48, secured to cross-beams 49 and 50 or any other suitable support. The pulleys 47 and 47' are connected by means of a belt 45.

44 is a counter-shaft, which is driven from the main shaft 51 by means of a belt 45' passing around pulleys 46 and 46'.

56 is a coal-hopper, which is connected by means of a chute 55 with pulverizing-rolls 54. The pulverized fuel is raised from the pulverizer 54 by means of an endless carrier passing around sprocket-wheels 40'. The endless carrier is surrounded by means of a casing 40, which prevents the escape of any of the powdered fuel. The fuel is delivered by the endless carrier through a chute to a fuel-feeder 41. (Shown in detail in Figs. 6 and 7.) Within the fuel-feeder 41 is a screw consisting of blades 52, secured to a shaft 53. The shaft 53 is rotated by means of a sprocket-chain passing around a sprocket-wheel 38, secured to said shaft, and a sprocket-wheel 39, secured to the main shaft 51. The screw 53 is surrounded by a cone 35 within the fuel-feeder 41. A space is left between the cone 35 and the casing of the fuel-feeder 41, which space communicates with the pipe 37. The end of the pipe 37 passes through the side wall 31 of the furnace and terminates in the ash-pit 32. The end 33 of the fuel-feeder 41 also projects through the side wall of the furnace and is arranged to discharge the powdered fuel in the combustion-chamber 57 and against the gas-receiver 23.

36 is an oil-cup, by means of which the front bearing of the shaft 53 may be oiled.

42ª is a shaft which is supported on the fuel-feeder 41 and is driven from the counter-shaft 44, previously described. Mounted in the shaft 42ª is an eccentric 42, which drives a plunger 42', adapted to prevent the fuel from becoming clogged in the chute leading to the fuel-feeder 41. The sprocket-wheels 40' and endless carrier above described are driven from the shaft 42ª by means of a belt 43, and the pulverizing-rolls 54 are driven from said shaft by means of a belt 43'.

The operation of my furnace is as follows: Kindling is first inserted through the doors 5 and placed on the grates 24 of the combustion-chamber and lighted. Gasolene is now supplied to the upper cylinder 73 of the engine 72 from the tank 77, and said engine operates to run the suction-fan 71. This draws the smoke and unconsumed gases from the combustion-chamber through the flues of the boiler and forces them into the heat-retainer and gas-generator 101, from which they pass through the pipe 110 back to the gas-receiver 23 and thence through the openings 23' back to the combustion-chamber. This is continued until the heat-retainer and gas-generator rise to the temperature of about 720° Fahrenheit. As soon as it reaches this temperature the valve 85 is opened to allow water to pass from the tank 81, through the pipe 84, to the upper end of the gas-generator 101. The water is here decomposed into hydrogen and oxygen and also partially combined with the smoke and unconsumed gases of the furnace. The resulting gases are forced through the pipe 110 into the gas-receiver 23, from which they pass through the openings 23' and 25 into the combustion-chamber 57 and the ash-pits 32. Any surplus water which is supplied to the gas-generator 101 will pass down into the tank 107, together with various products of combustion, and may be drawn off through the pipe 108. The part of the gases which pass out through the openings 23' into the combustion-chamber 57 will be immediately consumed. The part of the gases which pass out through the opening 25 into the ash-pit 32 are drawn in through the pipes 37 to the fuel-feeders 41, where they pass into the combustion-chamber 57, together with the powdered fuel, through the nozzles 33, and are projected against the sides of the gas-receiver 23, where they are consumed, together with the powdered fuel.

In case the pressure falls in the boiler 51 the diaphragm of the regulator 95 will descend, thus opening the governor-valve of the engine 72 and causing the engine to run at a higher speed, and at the same time causing the fuel-feeders to also run at a higher speed. This will cause a much greater draft through the furnace and at the same time supply it with more fuel, so as to raise the temperature and consequently the pressure in the boiler 51. At the same time that the governor-valve of the engine 72 is opened the valve 68 in the pipe 66 is turned, so as to open said pipe and allow the air to be drawn into the pipe 70 from the dead-air space 30, and at the same time the rear valve 19 is opened to allow the atmospheric air to enter said dead-air space. The air which enters the valve 19 is thoroughly heated in passing over the boiler, and hence does not cool the smoke and unconsumed gases. The object of this is to supply the gases which are fed to the furnace with an additional amount of oxygen, as that produced in the generator 101 might not be sufficient when the fan is running at a high rate of speed. As soon as the pressure in the boiler 51 is restored to the normal amount the diaphragm of the regulator 95 will be forced upward, so as to slow the engine 72, and at the same time the valves 68 and 19 will be closed.

In case the valve 19 should fail to work or for any other reason a vacuum should be formed in the air-space 30, the automatic inlet-valves 18 will open under the pressure and allow the atmospheric air to enter said dead-air space.

Having fully described my invention, what I claim as new, and desire to secure by Letters Patent of the United States, is—

1. The combination with a furnace, of a boiler, a vacuum-fan for drawing the smoke and unconsumed gases directly from the flues of said boiler, means for decomposing water and supplying the oxygen derived therefrom to the smoke and unconsumed gases, and means for returning the smoke and unconsumed gases to said furnace.

2. The combination with a furnace, of means for withdrawing the smoke and unconsumed gases from said furnace, means for supplying oxygen to the smoke and unconsumed gases, a gas-receiver of refractory material within the combustion-chamber of said furnace, a passage from said gas-receiver to said combustion-chamber, and means for returning the smoke and unconsumed gases to said gas-receiver.

3. The combination with a furnace, of means for withdrawing the smoke and unconsumed gases from said furnace, means for supplying oxygen to the smoke and unconsumed gases, a refractory gas-receiver within the combustion-chamber of said furnace, means for returning the smoke and unconsumed gases to said gas-receiver, passages leading from said gas-receiver to the ash-pit of said furnace, and means for regulating said passages.

4. The combination with a furnace, of a refractory gas-receiver within the combustion-chamber of said furnace, passages connecting the interior of said gas-receiver with said combustion-chamber, and means for withdrawing the smoke and unconsumed gases from said furnace and delivering them to said gas-receiver.

5. The combination with a furnace, of a refractory gas-receiver within the combustion-chamber of said furnace, a passage from said gas-receiver to said combustion-chamber, means for withdrawing the smoke and unconsumed gases from said furnace and delivering them to said gas-receiver, and means for feeding pulverized fuel into said combustion-chamber in proximity to said gas-receiver.

6. The combination with a furnace, of a fan for withdrawing the smoke and unconsumed gases from said furnace, and a fuel-feeder for feeding fuel to said furnace, said fuel-feeder being also adapted to act as a fan for returning a portion of the smoke and unconsumed gases withdrawn by said first-named fan.

7. The combination with a furnace, of a fan for withdrawing the smoke and unconsumed gases from said furnace, a fuel-feeder for feeding pulverized fuel to said furnace, said fuel-feeder being also adapted to act as a fan for returning a portion of the smoke and unconsumed gases withdrawn by said first-named fan, and means for automatically regulating said fuel-feeder.

8. The combination with a furnace, of a fan for withdrawing the smoke and unconsumed gases from said furnace, a fuel-feeder for feeding pulverized fuel to said furnace, said fuel-feeder being also adapted to act as a fan for returning a portion of the smoke and unconsumed gases withdrawn by said first-named fan, and means for automatically regulating said fan and fuel-feeder.

9. The combination with a furnace, of a passage leading from said furnace to the combustion-chamber thereof, means for withdrawing the smoke and unconsumed gases from said furnace through said passage, an air-heating chamber separated from the combustion-chamber of the furnace, and means for automatically connecting said air-heating chamber with said passage.

10. The combination with a furnace, of a passage leading from said furnace to the combustion-chamber thereof, means for withdrawing the smoke and unconsumed gases from said furnace through said passage, an air-heating chamber separated from the combustion-chamber of said furnace but adjacent thereto and partially surrounding the boiler of said furnace, and means for throwing said air-heating chamber into and out of communication with said passage.

11. The combination with a furnace, of a passage leading from said furnace to the combustion-chamber thereof, a fan for withdrawing the smoke and unconsumed gases through said passage, an air-heating chamber separated from the combustion-chamber of said furnace, and means for simultaneously increasing the speed of said fan and placing said air-heating chamber in communication with said passage.

12. The combination with a furnace, of a passage leading from said furnace to the combustion-chamber thereof, a fan for withdrawing the smoke and unconsumed gases through said passage, an air-heating chamber separated from the combustion-chamber of said furnace, and means for automatically and simultaneously increasing the speed of said fan and placing said air-heating chamber in communication with said passage.

13. The combination with a furnace, of a passage leading from said furnace, means for withdrawing the smoke and unconsumed gases through said passage, an air-heating chamber in said furnace, a second passage leading from said air-heating chamber to said first-named passage, a valve in said second passage, a valve for said air-heating chamber, and means for automatically actuating said valves by the pressure in the boiler of said furnace.

14. The combination with a furnace, of a fuel-feeder for said furnace consisting of an outer casing provided with an outlet leading to said furnace, a conical casing within said outer casing, fuel-feeding device within said conical casing, said fuel-feeding device being also adapted to act as a fan, and a gas-conduit communicating with the space between said outer and inner casings.

In testimony whereof I have hereunto set my hand and affixed my seal in the presence of the two subscribing witnesses.

FRED. L. McGAHAN. [L. S.]

Witnesses:
W. A. ALEXANDER,
WM. T. JONES.